US010782596B2

(12) United States Patent
Wilson (10) Patent No.: US 10,782,596 B2
(45) Date of Patent: Sep. 22, 2020

(54) ROTATION ACTIVATED QUICK-RELEASE SYSTEM

(71) Applicant: Jeffrey Overall, Costa Mesa, CA (US)

(72) Inventor: Tyler Wilson, Ponca City, OK (US)

( * ) Notice: Subject to any disclaimer, the term of this patent is extended or adjusted under 35 U.S.C. 154(b) by 0 days.

(21) Appl. No.: 16/417,395

(22) Filed: May 20, 2019

(65) Prior Publication Data

US 2019/0271903 A1 Sep. 5, 2019

(51) Int. Cl.
*G03B 17/56* (2006.01)
*F16M 13/02* (2006.01)

(52) U.S. Cl.
CPC ........... *G03B 17/561* (2013.01); *F16M 13/02* (2013.01)

(58) Field of Classification Search
USPC ......................................................... 396/419
See application file for complete search history.

(56) References Cited

U.S. PATENT DOCUMENTS

| 3,480,310 | A | * | 11/1969 | McElwain | .............. | F16D 3/387 |
| | | | | | | 403/322.2 |
| 3,583,042 | A | | 6/1971 | Ishizaka | | |
| 5,575,754 | A | | 11/1996 | Konomura | | |
| 6,196,504 | B1 | * | 3/2001 | Lemke | ................. | F16M 11/041 |
| | | | | | | 248/187.1 |
| 6,302,617 | B1 | * | 10/2001 | Rumpp | .................... | B60D 1/52 |
| | | | | | | 285/401 |
| 6,779,932 | B2 | * | 8/2004 | DeSorbo | ............. | F16M 11/041 |
| | | | | | | 396/419 |
| 6,966,519 | B2 | | 11/2005 | Salentine | | |
| 9,081,256 | B2 | | 7/2015 | Dering | | |
| 9,247,787 | B2 | | 2/2016 | Dering | | |
| 9,249,923 | B2 | * | 2/2016 | DiCarlo | ................. | F16M 13/02 |
| 9,332,822 | B2 | | 5/2016 | Hunt | | |
| 9,360,739 | B2 | | 6/2016 | Fliger | | |
| 9,611,881 | B2 | | 4/2017 | Khodapanah | | |
| 9,820,534 | B1 | | 11/2017 | Kelley | | |
| 9,869,423 | B2 | | 1/2018 | Khodapanah | | |
| 9,920,876 | B2 | | 3/2018 | Prugue | | |
| 10,025,166 | B2 | | 7/2018 | Clearman | | |
| 2018/0194488 | A1 | * | 7/2018 | Zhao | .................... | G03B 15/006 |
| 2020/0050086 | A1 | * | 2/2020 | Thomson | ............. | F16M 11/041 |

* cited by examiner

*Primary Examiner* — Rodney E Fuller (57) ABSTRACT

A rotation activated quick-release mount. A rack and pinion system converts rotation of a housing into linear expansion and contraction of the housing. A modular plate may be removably coupled with the housing. A biasing device may urge the housing into a base position. The plate may be installed when the housing is in the base position.

17 Claims, 14 Drawing Sheets

ROTATION ACTIVATED QUICK-RELEASE SYSTEM

FIELD OF INVENTION

The present invention relates to quick-release systems. Specifically, it provides a rotation activated quick-release mount utilizing a rack-and-pinion system.

BACKGROUND

Quick release mounting systems allow photographers and videographers to stably mount and easily detach cameras from bodily accoutrements, tripods and other devices. The plate and housing model of quick release systems was popularized by the Arca Swiss® quick release system. Many derivatives of the system exist today.

Quick release systems have been developed for different use cases. Push button and spring-loaded configurations have been developed to improve ergonomics and ease of use. Rotation activated quick release systems utilize rotation of the housing to enable coupling and removal of a plate. These systems require complex interaction of many mechanisms to coordinate rotation of a housing with the housings ability to lock and release a plate.

The current invention utilizes a rack-and-pinion system to convert rotation of a housing into linear movement of coupling mechanisms. The number of parts required to achieve rotation activated release is decreased, simplifying and decreasing the cost of manufacture. The rack-and-pinion system converts rotation force directly into linear expansion and contraction of coupling mechanisms.

The current improves on the prior art in two respects. First, rotation of the housing is directly translated into linear expansion of the housing to allow removal of a plate. The rack and pinion system simplify manufacturing by eliminating the need for intermediate part(s) to translate rotation into linear movement. Second, it is not necessary for the biasing device(s) to connect with the stationary aspect of the mounting system. The biasing device is housed within the rotation aspect, simplifying manufacture.

SUMMARY

The current invention utilizes a rack-and-pinion system to create a quick release mounting system. A plate can be securely installed into a receiver component of a housing. The plate may be any component capable of coupling a camera or other device. The receiver is operatively coupled with and can rotate relative to stationary components of the housing. The rotation range may be limited between a base position and an open position.

A base component may support the relative bottom of the receiver. Rails may be disposed on the perimeter of the base, surrounding the receiver to allow the receiver to rotate within it. One or more rack components rotate in conjunction with the receiver. The rack components are configured to operatively engage a pinion component. The pinions and rack have corresponding gears. Rotation of the receiver is converted into linear movement of the racks. Adjustable coupling components coupled with the racks will move towards or away from each other based on the direction of rotation. Gear ratio of the corresponding gears is calibrated to allow the desired linear expansion as a result of a change in rotation orientation. Linear expansion may allow coupling or removal of the plate by altering distance between the adjustable coupling components.

At least one biasing device may engage the receiver and a rack. The biasing device may urge the receiver to return to a base position as it is rotated towards the open position. Rotation force sufficient to overcome the opposing force of the biasing device must be exerted on the receiver to achieve rotation. When the receiver is rotated to the open position the force exerted by the biasing components may be great enough to return the receiver to the closed base when the countervailing rotation force is removed.

DRAWING NUMERALS 10 plate
11 housing
12 coupling means
14 divot
15 indents
16 rails
18 boundary
22 receiver
24 sidewall
25 retraction edge
26 first stop
27 second stop
28 bumper
30 lock
31 push button
32 guard
35 seat
39 chamfered edge
40 tooth
41 release point
43 tooth screw
44 rack
45 rack cutouts
46 rack gears
47 tooth spring
48 biasing device
49 second pinion recess
50 pinion
51 rack gears
52 plinth
53 lock spring
54 base
55 slot
57 lock stop
60 attachment screws
63 biasing cavity
64 groove
70 base position
72 open position
80 planar width
82 tooth gap
90 vertical axis

DETAILED DRAWING DESCRIPTION

Figure 1A:
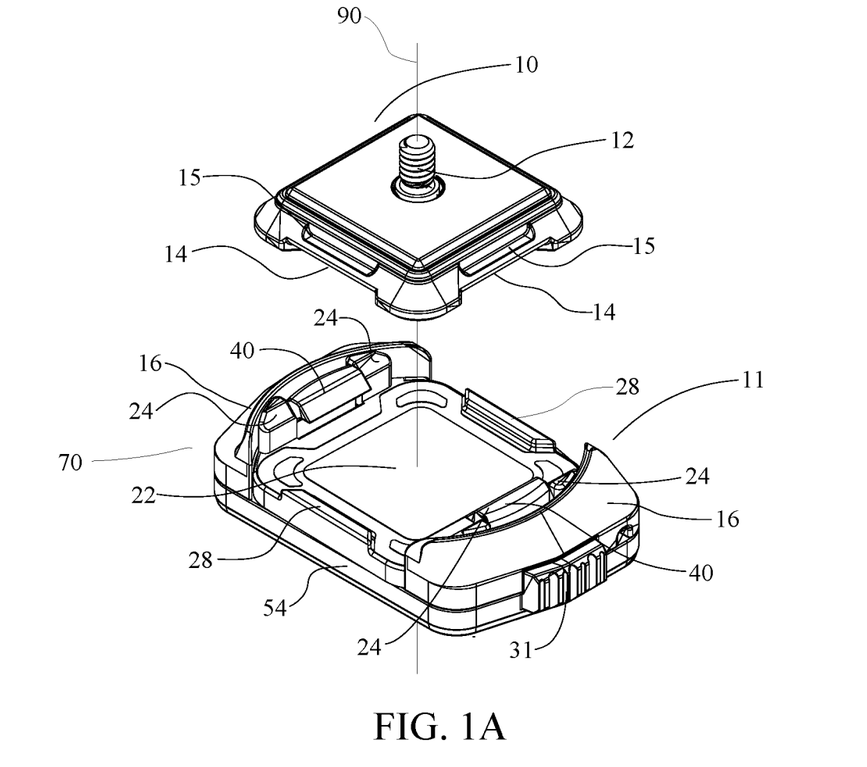
FIG. 1A shows a perspective view of a quick release system with a plate detached from a housing.
Figure 1B:
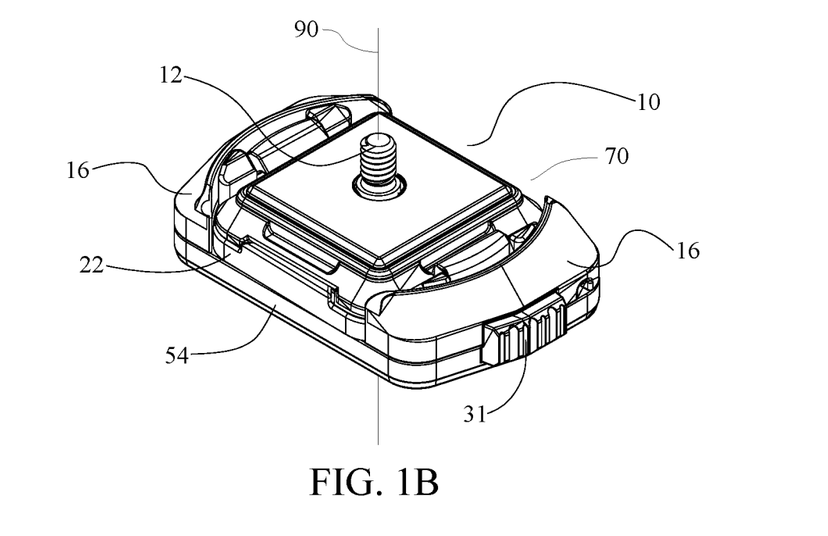
FIG. 1B shows a perspective view of a quick release system with a plate coupled with a housing.
Figure 2:
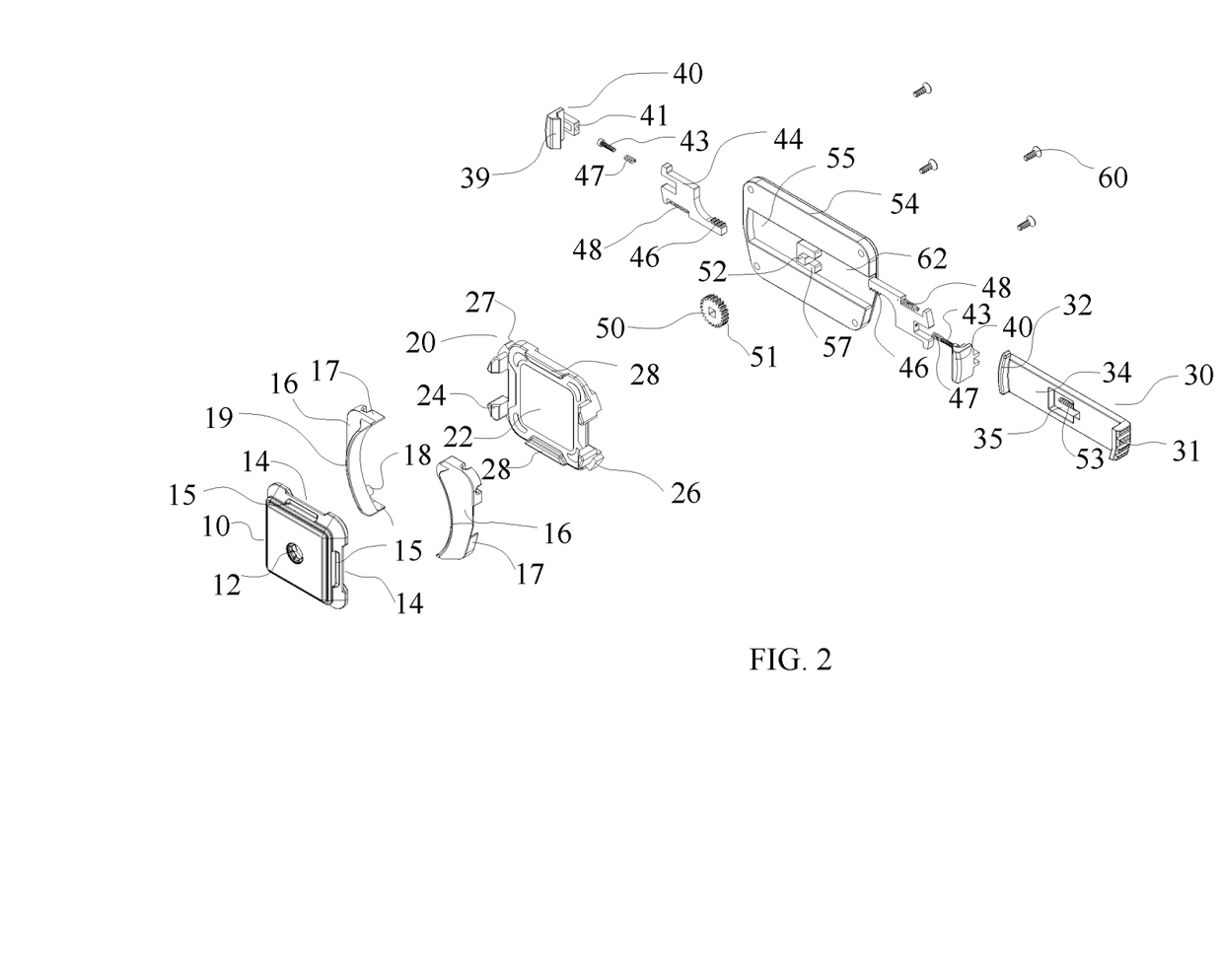
FIG. 2 shows an exploded perspective view of the quick release system.
Figure 3A:
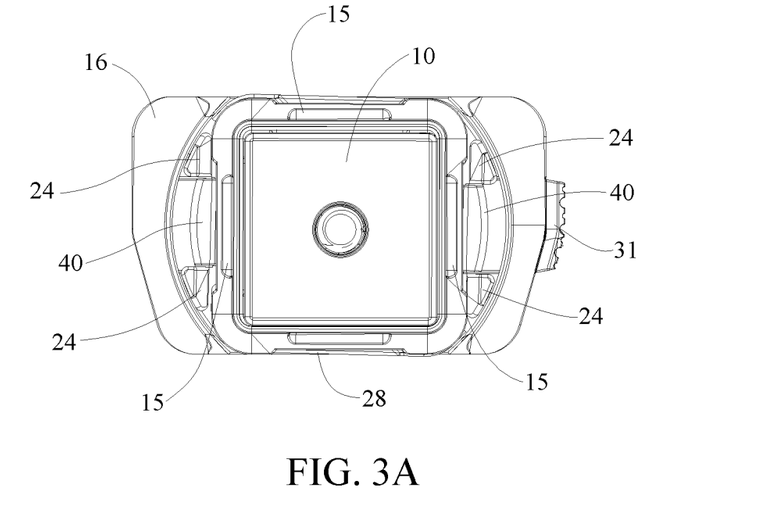
FIG. 3A shows a top view of a plate positioned above a receiver component of a housing.
Figure 3B:
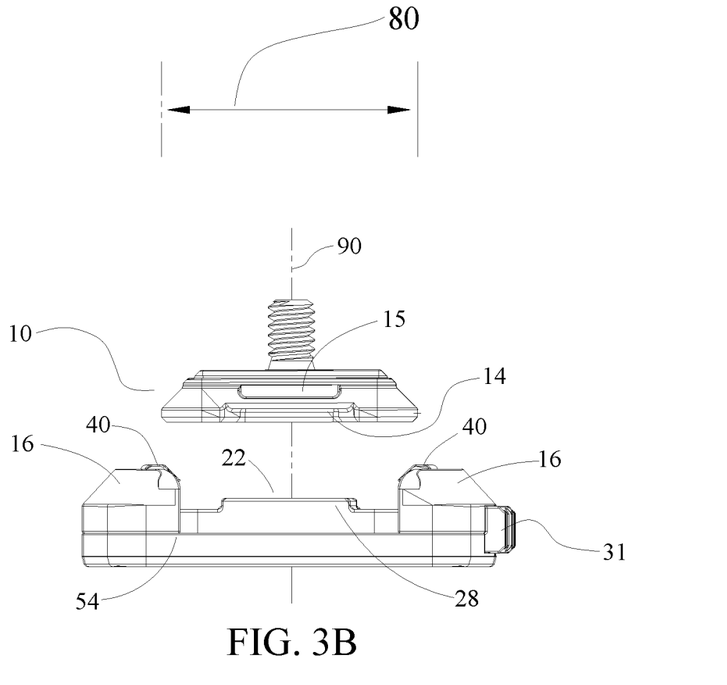
FIG. 3B shows a front view of a plate positioned above a receiver component of a housing.
Figure 3C:
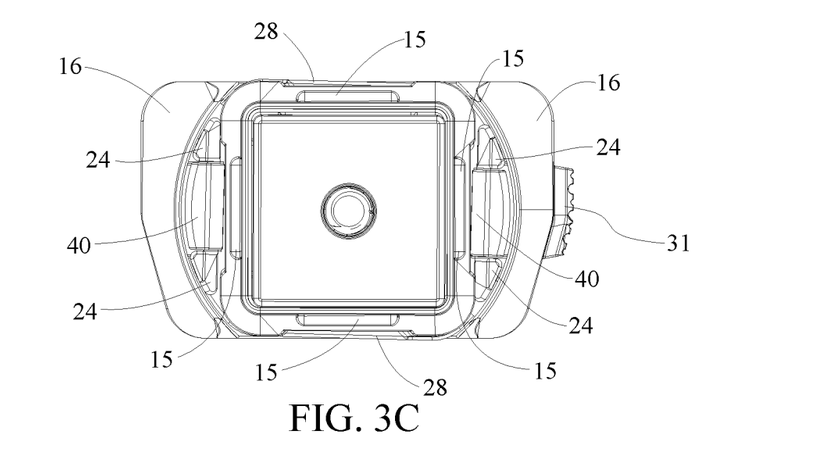
FIG. 3C shows a top view of a plate contacting teeth components of a housing. The plate is being installed into the receiver.
Figure 3D:
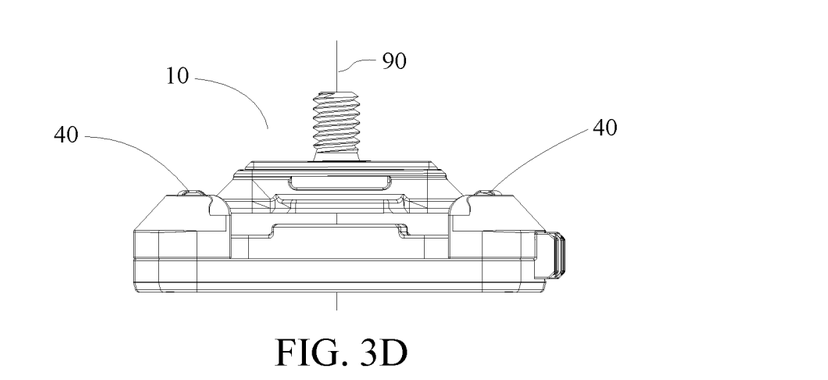
FIG. 3D shows a front view of a plate contacting teeth components of a housing. The plate is being installed into the receiver.
Figure 3E:
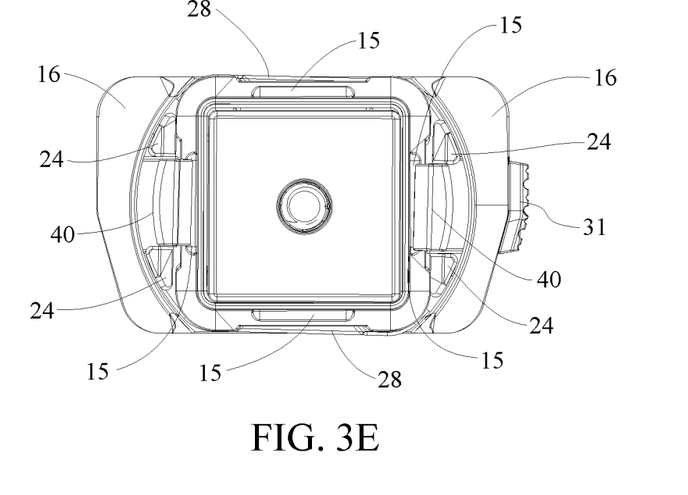
FIG. 3E shows a top view of a plate installed into a receiver. A housing is in an unactuated position.
Figure 3F:
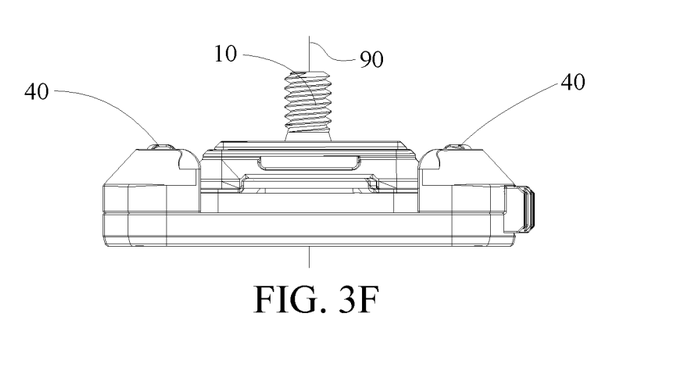
FIG. 3F shows a front view of a plate installed into a receiver. A housing is in an unactuated position.

The quick-release system is comprised of a housing 11 and a detachable plate 10. FIGS. 1A-B show a housing in a base position 70. A receiver 22 is disposed between rails 16 while in the base position 70. The front and back edges of the receiver 22 may align with the edge of a base 54. The rails 16 and base 54 couple at the perimeter of the base 54. The rails 16 and base 54 form stationary aspects of the housing 10. The rails 16 and base 54 may be coupled by bolts, threaded screws, adhesion, or other adequate coupling means.

Teeth 40 extend around and form part of the outer perimeter of the receiver 22. The teeth 40 are adjustable coupling components. A tooth gap 82 forms the space between the teeth 40. The teeth 40 are expandable to allow installation and removal of the plate 10, as explained further below. Four sidewalls 24 extending at the corners of the receiver 22 may provide lateral stabilization support of the plate 10. The perimeter of the outer surface of the exemplary sidewalls 24 and teeth 40 are arcuate to contour with the inner edge of two exemplary rails 16. The rails 16 couple with a base 54. A push button 31 aspect of a lock 30 extends from an aperture in the right rail 16 and base 54. The rails 16 are spaced to allow rotation of the receiver 22 extending beyond the base 54 perimeter. The exemplary embodiment tapers toward the relative front for ergonomic and aesthetic purposes.

The plate 10 contains camera coupling means 12. The exemplary coupling means 12 is a ¼"20 screw. The exemplary plate 10 has four symmetrical sides. Each side comprises an identical indent 15 on the top edge. The indent 15 corresponds to the surface of the teeth 40. The teeth 40 engage and couple the plate 10 when the receiver 22 is in the base position 70. The symmetrical sides enable installation of the plate 54 into the receiver 22 at the most desirable orientation based on the dimensions and features of a coupled device.

The receiver 22 comprises a bumper 28 at both a front and back edge. The plate 10 may comprise an identical divot 14 on the bottom edge of all four sides. The bumpers 28 are configured to engage the front and back facing divots 14 of an installed plate 10 and provide additional resistance to horizontal movement.

FIGS. 3A-3F demonstrate the pressure fitting installation process in a base position 70. The perimeter of the plate 10 is aligned with the teeth 40 and pressed downward. In the base position 70 the tooth gap 82 is less than the planar width 80 of the plate 10. The exemplary teeth 40 are chamfered in a configuration permitting downward force to push the teeth 40 outward. The teeth 40 are forced away from the receiver 22. A tooth spring 47 (see FIG. 5A) biases each tooth 40 to the unretracted, base position 70.

The tooth springs 47 move independently of the rotation of the receiver 22 and enable installation of a plate 11 in an installation position with the racks 44 not extended. Each tooth spring 47 is positioned between a release point 41 and the head of a tooth screw 43 (see FIGS. 5A-5C). The tooth screws 43 couple with a rack 44 and extend through an aperture in the release point 41, terminating in a head configured to withstand the pressure of a compressed spring 47 and prevent the spring 47 from dislodging. The release point 41 and tooth screw 43 may define the range of tooth 40 retraction relative to the rack 40. When the plate 10 has cleared the tooth 40, the tooth spring 47 urges the tooth 40 over the indent 15, locking the plate 10 within the receiver 22.

The exemplary tooth springs 47 are positioned around the tooth screw 43. Installation while the receiver 22 is in a base position 70 may be desirable because the teeth 40 are biased toward a tooth gap 82 capable of coupling the plate 10. In the base position 70, the exemplary teeth 40 abut the indents 15, preventing vertical movement, and exerting enough pressure on the plate 10 to prevent horizontal dislodgement. The adjacent surfaces of the teeth 40 and a coupled plate 10 may be substantially perpendicular to a vertical axis 90. The teeth 40 may be configured to hook into the plate 10.

Figure 7A:
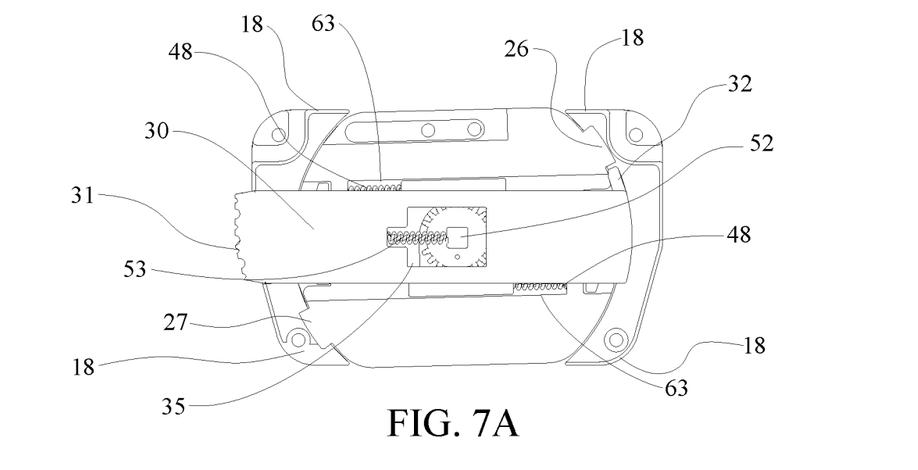
FIG. 7A shows a bottom perspective view with the base removed and lock unactuated.

A lock 30 maintains the base position 70 when unactuated (see FIG. 7A). The lock 30 is positioned between the receiver 22 and base 54, extending from the push button 31 to a guard 32 at opposing ends. An opening or seat 35 is disposed within the relative center of the lock 30. The seat 35 is configured to house a plinth 52 extending from the base 54. A pinion 50 may couple with the plinth 52. A lock spring 53 is disposed between the plinth 52 and the inner edge of the seat 35. The lock spring 53 may contact the pinion 50. A lock stop 57 may abut the plinth 52 and maintain the desired alignment of the lock spring 53. The lock spring 53 biases the lock 30 toward the unactuated position in which it extends from the perimeter of the housing 11.

Figure 4A:
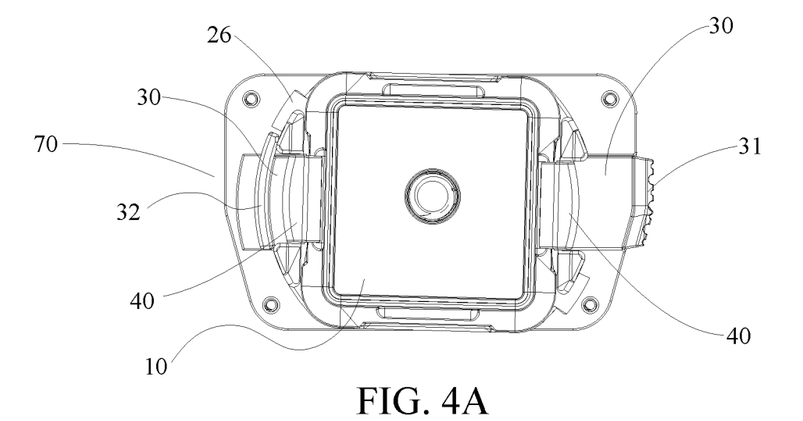
FIG. 4A shows a top view of the quick release system in a closed position. The rails are removed to allow depiction of a guard positioned relative to a stop extending from a receiver.
Figure 5A:
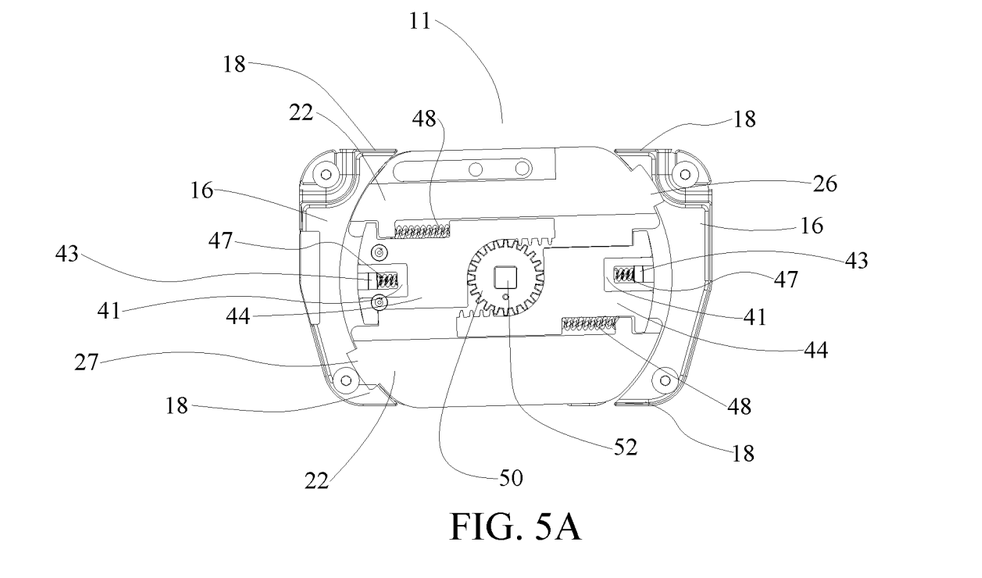
FIG. 5A shows a bottom view of a quick release system in a closed position. A base and lock are removed to permit viewing of operative components of the quick release system.
Figure 5B:
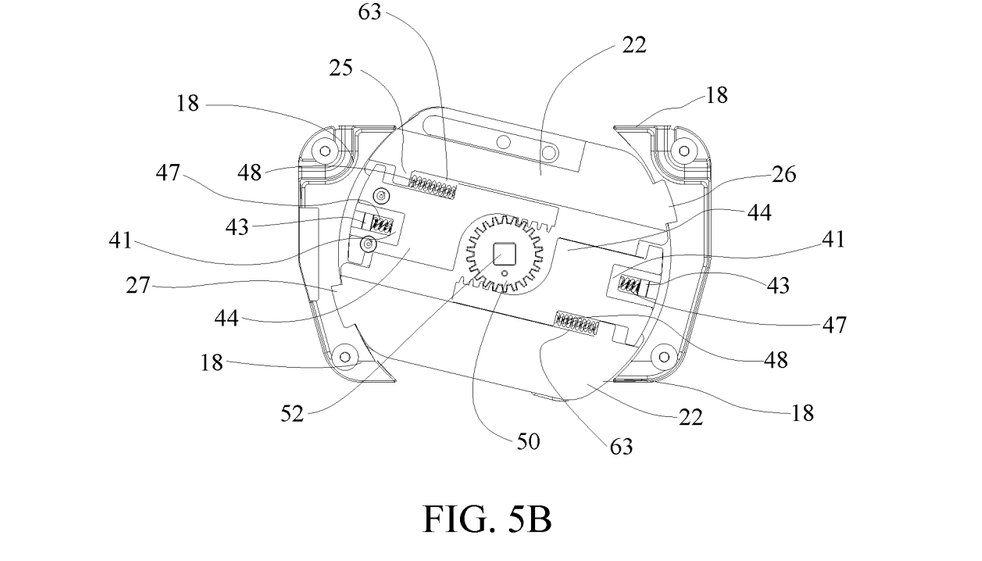
FIG. 5B shows a bottom view of a quick release system in an open position. The base and lock are removed to permit viewing of operative components of the quick release system. The receiver is partially rotated.
Figure 5C:
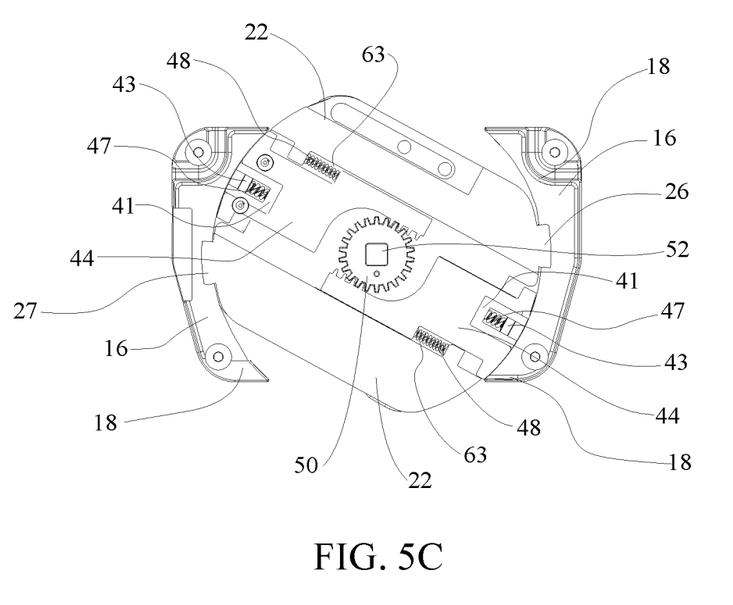
FIG. 5C shows a bottom view of a quick release system in an open position. The base is removed to permit viewing of operative components of the quick release system. The receiver is fully rotated to an open position.
Figure 6:
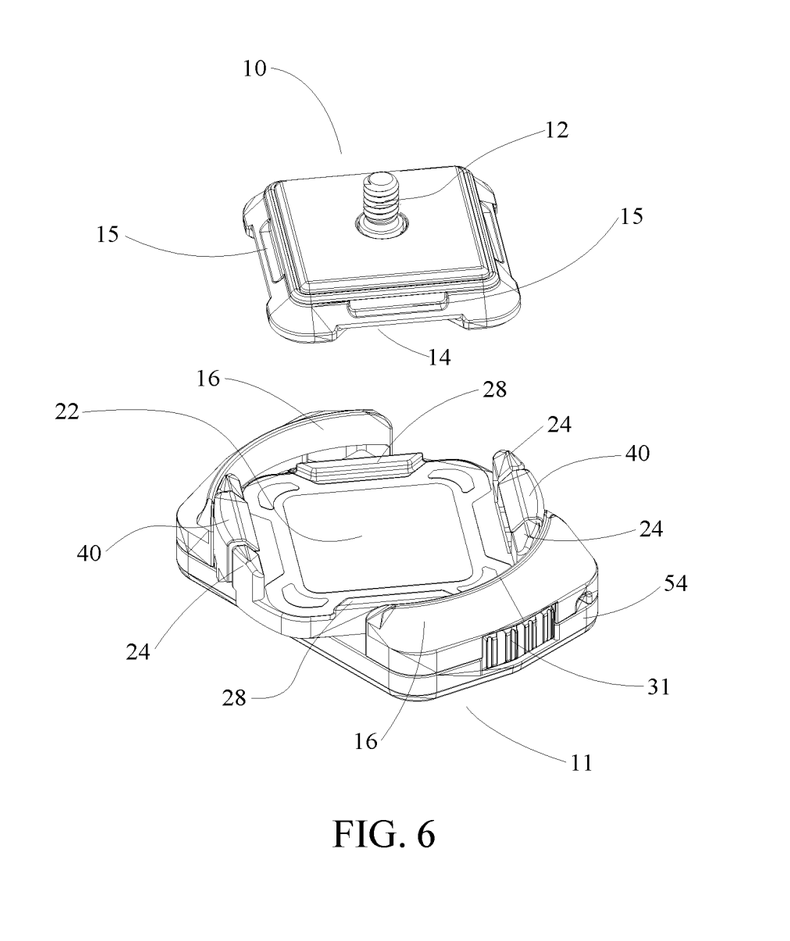
FIG. 6 shows a perspective view of the quick release system in an open position with a plate detached.

FIGS. 5A-5C show a bottom view of the receiver 22 and rail 16 components with the base 54 removed. A first stop 26 and second stop 27 extend from the receiver 22 into grooves 64 between the rails 16 and a coupled base 54. The lock spring 53 biases a guard 32 aspect of the lock 30 to align with the stop 27 when the push button 31 is unactuated in the base position 70 (see FIG. 7A). The first stop 26 and the guard 32 contact and oppose each other, preventing the receiver 22 from rotating out of the base position 70, as seen from a top perspective in FIG. 4A and from a bottom perspective in FIG. 7A.

Figure 4B:
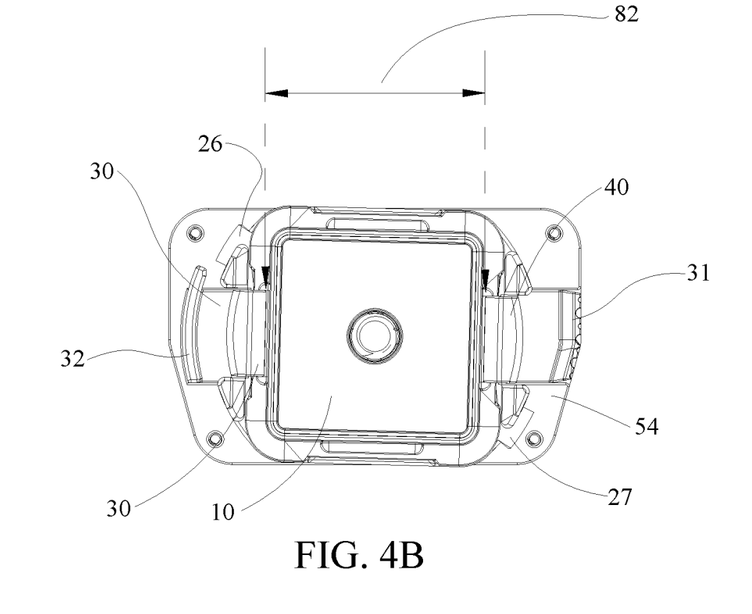
FIG. 4B shows a top view of the quick release system in an open position. The rails are removed to allow depiction of a guard positioned relative to a stop extending from a receiver.
Figure 4C:
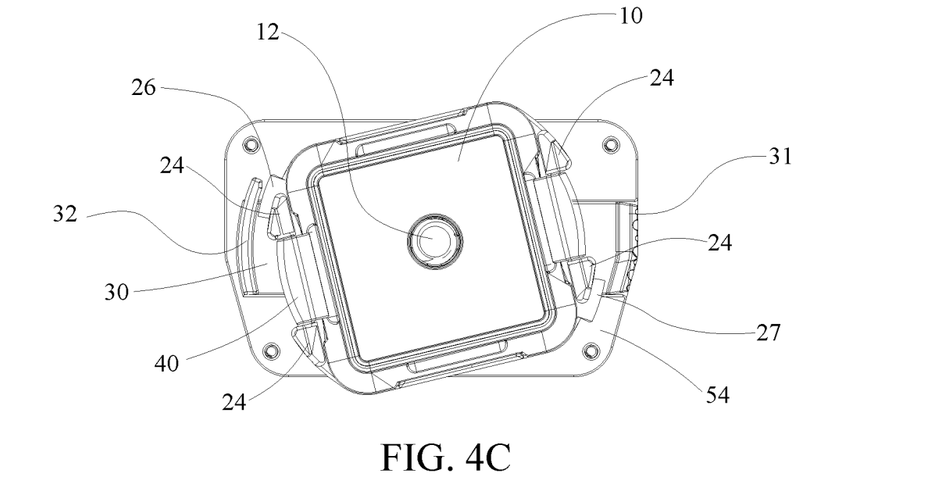
FIG. 4C shows a top view of the quick release system in an open position. A receiver and coupled plate are partially rotated through a rotation range.
Figure 4D:
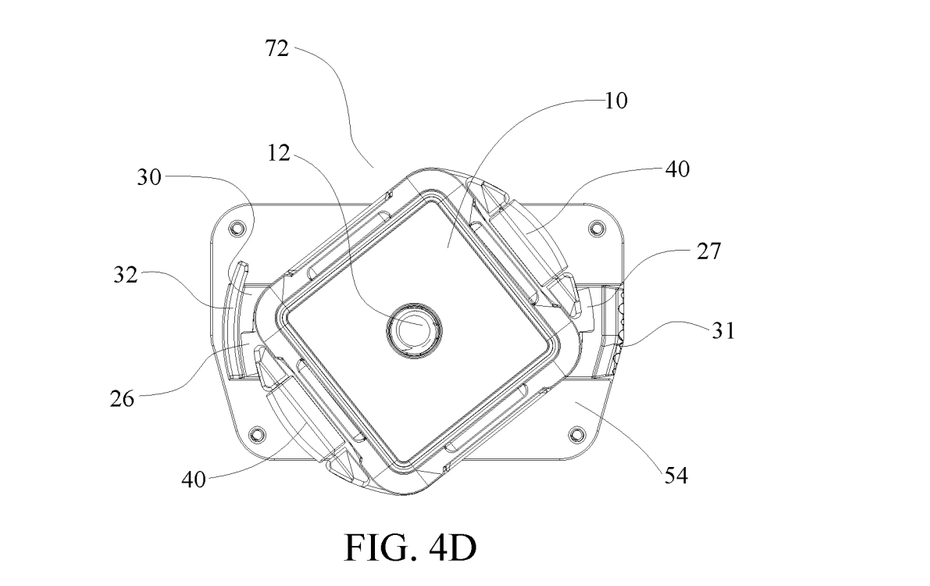
FIG. 4D shows a top view of a quick release system in an open position. A receiver and coupled plate are fully rotated through a rotation range.
Figure 7B:
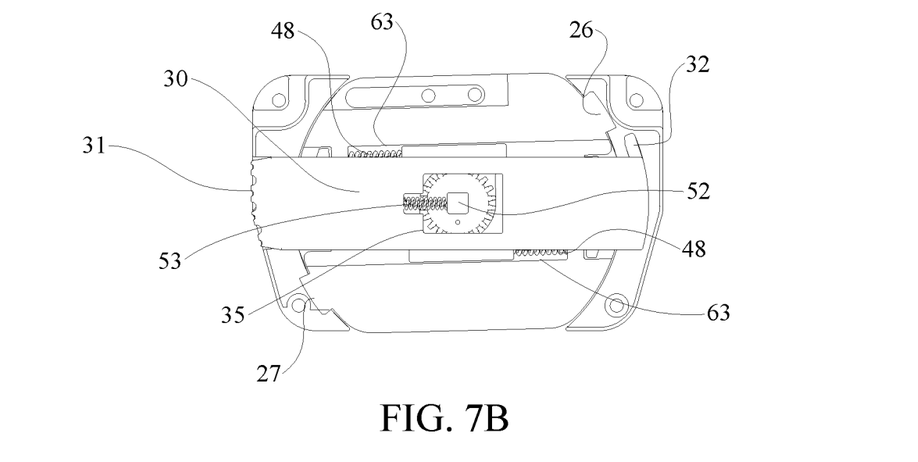
FIG. 7B shows a bottom perspective view with the base removed and lock actuated.
Figure 7C:
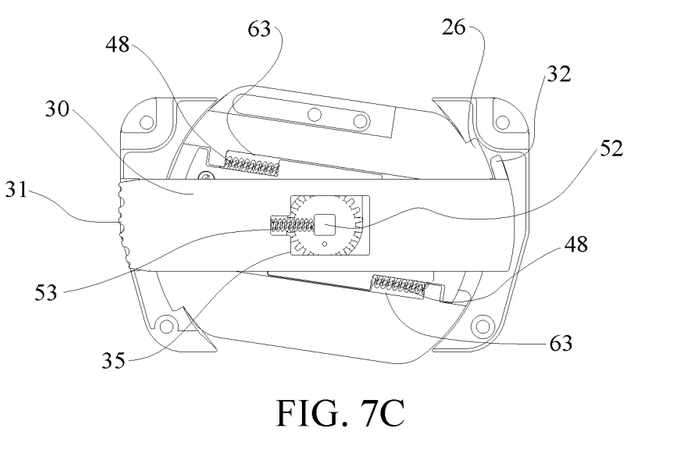
FIG. 7C shows a bottom perspective view with the base removed and lock actuated and the receiver rotated 10 degrees.
Figure 8A:
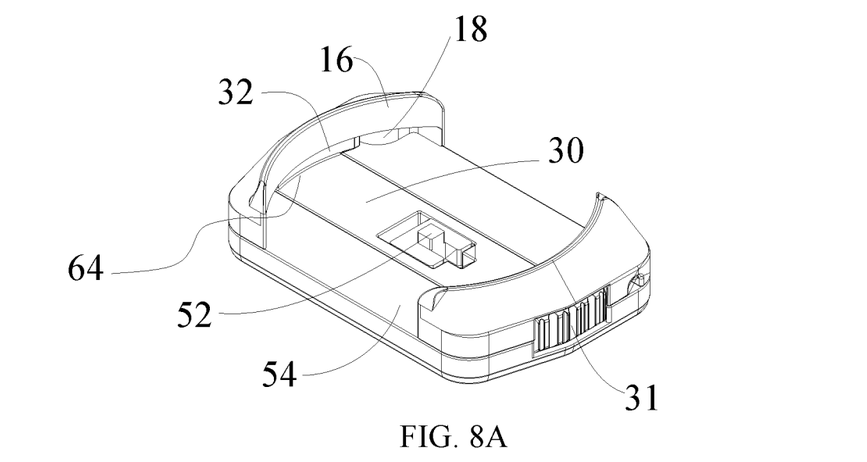
FIG. 8A shows a perspective view of the housing with the receiver, pinion and other components removed to allow depiction of a groove.
Figure 8B:
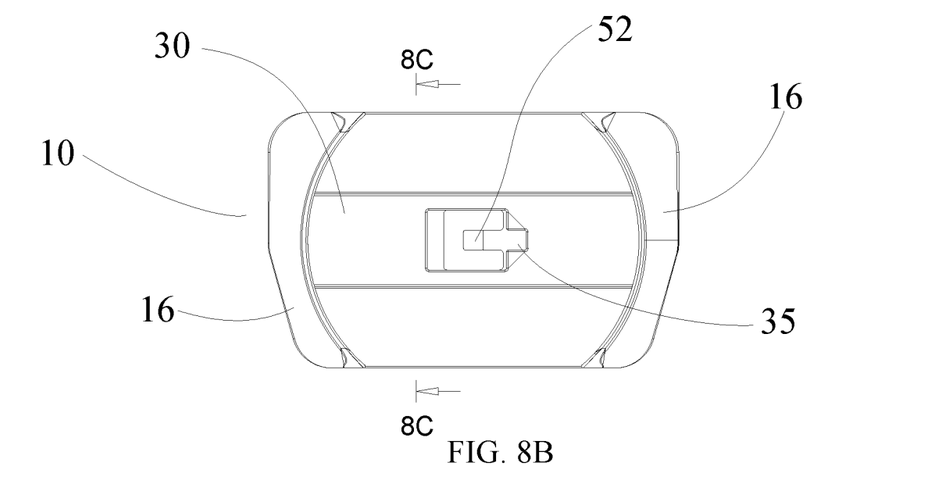
FIG. 8B shows a top view of the housing with the receiver, pinion and other components removed.
Figure 8C:
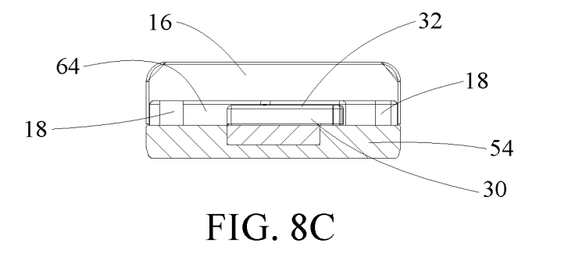
FIG. 8C shows a sectional view depicting a groove, taken from FIG. 7B

A stationary pinion 50 and two racks 44 are disposed between the receiver 22 and lock 30. The racks 44 are disposed within a recess in the bottom of the receiver 22 and configured to move in conjunction with the receiver 22. The pinion 50 couples around the plinth 52 in the exemplary embodiment. Pinion gears 51 extend radially from the pinion 50. Rack gears 46 are configured to operatively engage the pinion gears 51. In the base position 70 an arcuate edge of each rack 44 may abut the perimeter of the pinion 50. Biasing devices 48 are disposed in rack cutouts 45. The biasing devices 48 may be compression springs. The rack cutouts 45 align with retraction edges 25 on the bottom of the receiver 22 to form biasing cavities 63. A tooth 40 extends vertically, around the receiver 22, from each rack 44. The lock 31 is actuated by applying a predetermined force to the push button 31. The actuated guard 32 is forced toward the perimeter of the housing 11, out of the closed position 70, enabling the stop 27 to be rotated (see FIGS. 4A-B and 7B). In the exemplary embodiment the stop 26 is rotated counter-clockwise, when viewed from the top perspective of FIGS. 4A-4D. The locking spring 53 is compressed in the actuated position, urging the lock 30 back to the unactuated position. When rotated out of the base position 70, the outer edge of the first stop 27 abuts the guard 32 and counters the locking spring's 53 exertion of force on the lock 30 towards the base position 70. The interacting surfaces of the guard 32 and stop 27 are arcuate to enable rotation while they are in contact (See FIG. 4C-D).

The rack gears 46 operatively engage the pinion gears 51 as the receiver 22 is rotated. Engagement of the gears 46, 51 force the racks 44 to gradually extend linearly from the pinion 50 as they rotate. The receiver 22 rotates around the vertical axis 90 extending from relative center of the pinion 90.

Rotation of the receiver 22 is converted into linear movement of the racks 44. The rack gears 46 extend from a straight aspect of the rack 44. This forces the rack to gradually extend as the stop 26 moves through a rotation range permitted by the grooves 64. The gear ratio of the rack gears 46 and pinion gears 48 causes the desired linear extension of the racks 44 for the corresponding rotation. The racks 44 and pinion 50 are configured so the teeth 40 will be oriented at a retracted, open position 72, allowing removal of the plate 10, when the receiver 22 is rotated to a predetermined orientation relative to the base position 70 (See FIGS. 4D and 5C). The teeth 40 move linearly in unison with the rotation of the receiver 22 resulting in the expansion of the tooth gap 82.

Boundaries 18 extend from the rails 16 to the base 54, creating outer bounds of the grooves 64. The groove 64 dimensions may be defined by any boundaries 18, the base 54, or the boundary 18 and base 54 together. Grooves 64 permit rotation of the stops 26, 27 within a rotation range as defined by the boundaries 18. The first stop 26 is disposed between the guard 32 and a back boundary 18 while in the closed position 70. As the stops (26, 27) are rotated towards the opposing boundary 18 the racks 44 extend further from the pinion 50. When the stops 26, 27 are a predetermined distance from the opposing boundary 18 the teeth 40 are oriented at an open position 72. In the open position 72 the tooth gap 82 is great enough to enable vertical removal of the plate 10 from the receiver 22.

As the receiver 22 is rotated the rack cutouts 45 are forced towards the retraction edges 25, condensing the biasing cavity 63 (See FIGS. 5A-5C). The biasing devices 48 are compressed, or otherwise activated, and exert force on the rack cutout 45. The biasing devices 48 urge the racks 44 to towards the pinion 50, to the base position 70. Rotational force exerted by the user counteracts this biasing force. After the rotation plate 10 is removed and the rotation force is removed from the receiver 22 the biasing devices 48 will force the racks 44 into the pinion 50, causing the racks 44 and receiver 22 to rotate towards the closed position 70. When the closed position 70 is reached the unopposed force of the locking spring 53 will force the guard 53 back into alignment with the first lock 26, securing the receiver 22 and teeth 40 the in base position 70. The push button 31 is returned to the biased unactuated position.

I claim:

1. A rotation activated quick-release system, comprising:
   a. a plate comprising camera coupling means;
   b. a housing, said housing comprising at least one rail, a base, and a receiver;
   c. said receiver configured to couple a plate;
   d. said receiver comprising a plurality of sidewalls extending vertically, said sidewalls having arcuate outer surfaces corresponding to the arcuate rails;
   e. said receiver comprising at least one stop, said stop extending horizontally from said housing;
   f. said base and rails being coupled along the perimeter of said base and forming a groove configured to receive the stop;
   g. said rails and base coupling at the perimeter of said base, said rails being configured to coupling being configured to border the receiver and contour the sidewalls when coupled with the top perimeter of the base, said groove operatively coupling with the stop to allow movement of the stop within the groove;
   h. a lock substantially disposed between the receiver and base, said lock comprising a push button on one end and a guard on the opposing end;
   i. said lock comprising a seat, said seat housing a lock spring and plinth, said lock spring disposed between the plinth and perimeter of the seat, said lock spring biasing the lock to an unactuated position;
   j. said lock locking the receiver in a base position when in the unactuated position;
   k. said guard aligning with the stop to prevent movement of the stop within the groove when in an unactuated position;
   l. said push button extending beyond the perimeter of the base when in an unactuated position;

m. said push button being actuated at a predetermined to force the guard from the stop, thereby enabling movement of the stop within the groove;
n. a pinion coupled with the plinth, said pinion disposed between the base and receiver;
o. said pinion comprising a plurality of gears extending radially;
p. a plurality of racks disposed between the base and receiver, each said rack comprising a plurality of rack gears at one end and a tooth at the opposing end;
q. said rack gears operatively engaging with the pinion at one end and extending toward the perimeter of the base;
r. said racks extending linearly from the pinion when the receiver is rotated from the base position;
s. said teeth extending vertically from the rack;
t. said racks and receiver capable of a rotation range relative to the pinion, said rotation range being defined by the groove dimensions;
u. the teeth configured to couple the plate when the receiver is in the base position, said teeth expanding to allow removal of the plate when the receiver is rotated to an open position.

2. A rotation activated quick-release system, comprising:
a. two rails coupled with a base, said rails and base forming intervening grooves;
b. a receiver configured be lay parallel with the base and be disposed between the rails;
c. said rails, base and receiver comprising parts of a housing;
d. at least one stop extending from the receiver into at least one groove, said groove defining a rotation range, said rotation range comprising a base position and an open position;
e. a lock disposed between the receiver and base, opposing ends of said lock comprising a push button and a guard, said guard aligning with the stop in the base position at one end of the rotation range, said push button extending beyond the perimeter of the base to be accessible to manual actuation;
f. a seat comprising an opening in the lock, a plinth coupling with and extending from the base, said plinth being substantially disposed within the seat, a lock spring housed between the plinth and the boundary of the seat;
g. said lock spring biasing the lock to an unactuated position;
h. a pinion coupled with the plinth, pinion gears extending radially from said pinion;
i. two racks comprising rack gears capable of engagement with the pinion gears and configured to enable radial movement of the racks relative to the pinion;
j. two teeth, each tooth coupling with a rack and extending around the perimeter of the receiver;
k. the space between the teeth comprising a tooth gap;
l. a plate configured to fit within the receiver and teeth, said plate comprising camera coupling means;
m. a tooth gap less than the planar width of the plate when in an unrotated base position;
n. tooth springs biasing said teeth to a position in which they can couple an installed plate;
o. said teeth retracting to enable installation of the plate when in a base position;
p. the push button being actuated to move the guard to unlock the stop, thereby enabling movement of the receiver throughout the rotation range;
q. said stop countering the retraction biasing force of the lock spring to secure the lock in an unactuated position when the housing is rotated a predetermined distance from the base position;
r. said racks extending linearly from the pinion as the stop is rotated towards the open position;
s. the tooth gap exceeding the planar width when the stop is in the open position;
t. a biasing device disposed within the housing to exert force on the racks towards the base position when the receiver is rotated towards the open position.

3. A rack-and-pinion quick-release mount, comprising:
a. A base coupled with a plurality of rails, said base and rails forming a plurality of grooves;
b. A receiver with at least one stop disposed within a groove, said receiver being capable of rotation relative around a vertical axis;
c. A pinion and two racks disposed between the base and housing, said racks comprising gears capable of engaging the pinion, said racks extending horizontally from the pinion towards the perimeter of the receiver;
d. A tooth extending from the end of rack opposing the pinion, said teeth extending past the perimeter of the receiver when the receiver is in a base position;
e. Said racks extending from the pinion when rotated, whereby the teeth move towards the perimeter of the housing as the receiver is rotated towards an open position;
f. A plate configured to be coupled within the housing by the teeth when the housing is in the base position, said plate configured to be uncoupled by the teeth when the housing is in the open position.

4. The rack-and-pinion quick-release mount in claim 3, wherein at least one biasing device urges the receiver into a base position.

5. The rack-and-pinion quick-release mount in claim 3, wherein the teeth are biased towards the vertical axis.

6. A quick-release mount, comprising;
a. a housing comprised of a base and receiver;
b. said receiver comprising at least one rack, said rack disposed to exert force on at least one aspect of the receiver;
c. said rack comprising gears;
d. a pinion coupled with the base;
e. said pinion comprising gears,
f. said rack gears and pinion gears configured to operatively engage and enable rotation when a predetermined rotation force is exerted on the receiver;
g. said racks extending linearly from the pinion when the receiver is rotated from a base position;
h. said rack and receiver configured to create at least one biasing cavity;
i. a biasing device located within said biasing cavity;
j. said biasing device urging said racks to the base position;
k. at least one tooth extending from the end of a rack;
l. a plate with camera coupling means;
m. said tooth configured to couple the plate when the receiver is in the base position.

7. The quick release system in claim 6, wherein the said teeth are configured to enable vertical removal of the plate when the receiver is rotated to an open position.

8. The quick release system in claim 6, wherein the biasing device is a compression spring.

9. A quick release system, comprising:
a. a housing and a plate;
b. said plate comprising device coupling means;

c. said housing comprising a receiver capable of rotation relative to stationary aspects of said housing;
d. said housing comprising a rack-and-pinion system capable of converting rotational motion of the receiver into linear motion of the racks;
e. said rack-and-pinion system comprised of a pinion and at least one rack, said pinion coupling with one or more of the stationary aspects.

10. The quick release system in claim 9, wherein at least one tooth couples with a rack, said tooth configured to couple the plate with the receiver when the receiver is in a base position.

11. The quick release system in claim 9, wherein there is at least one biasing device, said biasing device configured to exert force on a rack and urge receiver towards a base position.

12. The quick release system in claim 9, wherein the receiver comprises at least one bumper and the plate comprises at least one divot.

13. A quick release system, comprising:
a. a housing, said housing comprising a receiver, base and at least one rail;
b. said receiver capable of rotation around a vertical axis;
c. a lock, said lock locking the receiver in a base position relative to the base and rail;
d. at least one biasing device disposed within receiver, said biasing device exerting force on receiver towards the base position when it is rotated.

14. The quick release system in claim 13, wherein the biasing device is a compression spring.

15. The quick release system in claim 13, wherein a pinion couples with the base and at least one rack is disposed to operatively engage said pinion and the receiver, rotation of said receiver causing the rack to simultaneously rotate relative to the pinion and extend therefrom.

16. The quick release system in claim 15, wherein at least one tooth extends from the end of the rack furthest from the pinion, said tooth extending around the perimeter of the receiver.

17. A rack-and-pinion quick release system, comprising:
a. a pinion, said pinion comprising pinion gears extending radially from the pinion;
b. a plurality of racks, said racks comprising rack gears configured to operatively engage with the pinion gears;
c. at least two of said racks comprising a tooth, the distance between said teeth comprising a tooth gap;
d. a plate with device coupling means;
e. a base position in which the tooth gap is configured to enable the teeth to couple the plate;
f. a receiver enabling simultaneous rotation of the racks relative to the pinion from the base position;
g. rotation of said receiver resulting in the increase of the tooth gap;
h. an open position in which the tooth gap is configured to enable removal of the plate.

* * * * *